United States Patent
Shah et al.

(10) Patent No.: US 6,623,550 B2
(45) Date of Patent: Sep. 23, 2003

(54) APPARATUS FOR CONTROLLING AIR QUALITY

(75) Inventors: Dipak I. Shah, Eden Prairie, MN (US); Chin-Hsiung Chang, Palatine, IL (US); John D. Howard, III, Mendota Heights, MN (US); Ronald P. Rohrbach, Flemington, NJ (US); Peter D. Unger, Morristown, NJ (US); Stephen F. Yates, Arlington Heights, IL (US); Brian C. Krafthefer, Stillwater, MN (US); Russel W. Johnson, Elmhurst, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/163,685

(22) Filed: Jun. 5, 2002

(65) Prior Publication Data

US 2003/0019359 A1 Jan. 30, 2003

Related U.S. Application Data

(62) Division of application No. 09/748,624, filed on Dec. 22, 2000, now Pat. No. 6,428,608.

(51) Int. Cl.[7] .......................... B01D 53/04; B01D 53/26
(52) U.S. Cl. .............................. 96/134; 96/146; 96/154; 55/385.2
(58) Field of Search ...................... 95/90, 114, 115, 95/117, 118, 120, 123, 126, 141, 148; 55/385.2, 385.3, 524, 527; 236/44 A, 44 C; 454/229, 236, 187; 96/115, 116, 134, 143, 146, 154

(56) References Cited

U.S. PATENT DOCUMENTS

2,753,950 A * 7/1956 Baker et al. .................. 96/115
3,034,221 A * 5/1962 Tuck et al. .................... 34/527
3,626,671 A * 12/1971 Ebeling, Jr. .................. 96/126

(List continued on next page.)

OTHER PUBLICATIONS

Desiccant Dehumidification & Cooling Systems Assessment & Analysis, R.K. Collier, Jr., Sep., 1997, U.S. Department of Energy, Contract No. DE–AC06–76RLO 1830, pp. 1–158.*
Desiccant Cooling: State–of–the–Art Assessment, Ahmad A. Pesaran et al., Oct., 1992, National Renewable Energy Laboratory, pp. 1–89.*
Experimental Evaluation of Commercial Desiccant Dehumidifier Wheels, Slayzak et al., May, 1996, National Renewable Energy Laboratory, Ab–Sorption Heat Pump Conference 1996, Quebec, Canada.*
Ashrae Transactions 1999, vol. 105, Pt. 2, "The Introduction of Demand–Controlled & Economizer Ventilation Strategies on Engergy Use in Buildings", Michael J. Brandemuehl, Ph.D., P.E. et al., pp. 1–11.*

(List continued on next page.)

*Primary Examiner*—Duane Smith
*Assistant Examiner*—Frank M. Lawrence

(57) ABSTRACT

A robust, relatively simple air quality control system that can control the air quality in buildings during both the heating and cooling seasons. In one illustrative embodiment, a first air stream is directed through an air treatment module and back into the inside space. A desiccant in the air treatment module adsorbs water, volatile organic compounds and/or particulate material from the first air stream. A second air stream is then directed through the air treatment module to a location outside of the inside space. The second air stream is preferably heated relative to the first air stream so that at least a portion of the adsorbed water, volatile organic compounds and/or particulate material are desorbed from the desiccant into the second air stream. The second air stream carries the desorbed water, volatile organic compounds and/or particulate material to a location outside the inside space.

23 Claims, 15 Drawing Sheets

U.S. PATENT DOCUMENTS

| | | | | |
|---|---|---|---|---|
| 3,889,742 | A | * | 6/1975 | Rush et al. .................. 126/616 |
| 4,340,112 | A | * | 7/1982 | Sutoh et al. ................. 165/204 |
| 4,341,539 | A | * | 7/1982 | Gidaspow et al. .......... 502/407 |
| 4,399,864 | A | * | 8/1983 | Lamar ........................ 165/229 |
| 4,448,757 | A | * | 5/1984 | Barnwell et al. ........... 422/113 |
| 4,955,205 | A | * | 9/1990 | Wilkinson ................. 62/176.4 |
| 5,042,997 | A | * | 8/1991 | Rhodes ..................... 236/44 C |
| 5,085,266 | A | * | 2/1992 | Arold et al. .................. 165/42 |
| 5,090,972 | A | * | 2/1992 | Eller et al. .................. 134/111 |
| 5,251,458 | A | * | 10/1993 | Tchernev ..................... 62/271 |
| 5,308,457 | A | * | 5/1994 | Dalla Betta et al. .......... 95/143 |
| 5,435,150 | A | * | 7/1995 | Khelifa et al. ................ 166/42 |
| 5,451,248 | A | * | 9/1995 | Sadkowski et al. ......... 426/419 |
| 5,514,035 | A | * | 5/1996 | Denniston .................. 454/121 |
| 5,685,897 | A | * | 11/1997 | Belding et al. ................ 55/527 |
| 5,725,639 | A | * | 3/1998 | Khelifa et al. ............. 55/385.3 |
| 5,827,355 | A | * | 10/1998 | Wilson et al. ................ 95/114 |
| 6,071,189 | A | * | 6/2000 | Blalock ....................... 454/236 |
| 6,083,304 | A | * | 7/2000 | Fujimura ..................... 95/113 |
| 6,197,097 | B1 | * | 3/2001 | Ertl et al. ..................... 96/143 |
| 6,478,858 | B2 | * | 11/2002 | Angermann et al. .......... 96/143 |

OTHER PUBLICATIONS

"A Computer Study of the Energy Savings from using Various Economizer Changeover Strategies in a Retail Store", Honeywell, Home and Building Control Division, Commercial Products, Golden Valley, Minnesota, Feb. 1997, pp. 1–15.*

* cited by examiner

APPARATUS FOR CONTROLLING AIR QUALITY

This application is a divisional of U.S. patent application Ser. No. 09/748,624, filed Dec. 22, 2000, now U.S. Pat. No. 6,428,608.

FIELD OF THE INVENTION

The present invention relates generally to methods and devices for improving indoor air quality. More particularly, the present invention relates to methods and devices for controlling humidity and/or for removing volatile organic compounds and particulate material from the inside space.

BACKGROUND OF THE INVENTION

Indoor air quality is a subject of increasing concern. Indoor air quality is impacted by several air contaminants such as humidity, volatile organic compounds (VOCs), semi volatile organic compounds (SVOCs), and particulate material. While it is desirable to control the level of humidity at a precise level, it is also desirable to cause a high rate of removal of the other components such as VOCs and particulate materials.

Normally, indoor air quality in commercial buildings is managed by controlling the fresh air ventilation rate. Leakage and sometimes outside combustion air supply provides sufficient refresh air supply for most residential structures. However, it will be more important to control the air composition as homes and buildings become tighter and as concern over the presence of organic impurities and particulates becomes greater. Currently, carbon adsorption, sometimes known as carbon filtration, is used to remove organic vapors from air streams. The strategy is usually to add enough carbon granules to an adsorption bed to remove organic compound impurities from the air for a period of weeks or months. Under normal circumstances, the carbon is used for three to six months and then replaced. Unfortunately, the performance and usage of this type of system is limited by cost of purchase and disposal of large carbon canisters and by the amount of back-pressure that can be tolerated in the forced air system.

Although it is important to remove organic impurities from building air, it is also important to remove or add the proper amount of water vapor. Humidity control is necessary because air that is too wet causes mold and other undesirable contaminants. This generates biologically-derived organic compounds and air dispersed biological molecules, which can cause health and building structure problems. Air that is too dry causes a decrease in the function of mucous membranes, which decreases human disease resistance.

While organic compounds typically should be removed at a level as high as possible, humidity should be controlled within a range, such as between 40–60% relative humidity. In the winter, humidity can be increased to this range by use of wicking or ultrasonic dispersion methods in commercial and residential buildings. In the summer, humidity can be decreased to this range by over-cooling the air at the cooling coil in the main air handling unit, and then re-heating the over-cooled air to a more reasonable supply level. The air is over-cooled to wring out the desired excess water. Reheat is often accomplished with a heating coil located in the main air handler and immediately downstream of the cooling coil (central reheat), or with smaller re-heat coils located in the discharge/supply registers (called terminals) located within the occupied space. A limitation of this approach is that over-cooling the air and then re-heating the over-cooled air can consume significant energy. Further, the cost and complexity of such systems can be high. For these and other reasons, the humidity in residential buildings is typically not controlled during the cooling season.

SUMMARY OF THE INVENTION

The present invention provides methods and devices for improving indoor air quality by providing a robust, relatively simple system that can control the air quality in buildings during both the heating and cooling seasons. In doing so, the present invention can control the humidity and remove volatile organic compounds and particulate material from the inside space.

In one illustrative embodiment of the present invention, and during a first cycle, a first air stream is directed through an air treatment module and back into the inside space. During this first cycle, a desiccant in the air treatment module adsorbs water, volatile organic compounds and/or particulate material from the first air stream. During a second cycle, a second air stream is directed through the air treatment module to a location outside of the inside space. The second air stream is preferably heated relative to the first air stream so that at least a portion of the adsorbed water, volatile organic compounds and/or particulate material are desorbed from the desiccant into the second air stream. The second air stream carries the desorbed water, volatile organic compounds and/or particulate material to a location outside the inside space.

The air treatment module preferably includes a chamber with an inlet, a first outlet and a second outlet. A first valve selectively obstructs the first outlet, and a second valve selectively obstructs the second outlet. The first air stream is directed through the air treatment module and back into the inside space by closing the first valve and opening the second valve. During this cycle, the air treatment module adsorbs water, volatile organic compounds and/or particulate material from the first air stream.

The second air stream is then directed through the air treatment module to a location outside of the inside space by opening the first valve and closing the second valve. The second air stream can be heated to a temperature above the first air stream in any number of ways, including for example, activating a heating element during a cooling cycle, or restricting the flow of the second air stream during a heating cycle. Other illustrative embodiments are contemplated, as further described below.

DETAILED DESCRIPTION OF THE INVENTION

The following detailed description should be read with reference to the drawings, in which like elements in different drawings are numbered in like fashion. The drawings, which are not necessarily to scale, depict selected embodiments and are not intended to limit the scope of the invention. In some cases, the drawings may be highly diagrammatic in nature. Examples of constructions, materials, dimensions, and manufacturing processes are provided for various elements. Those skilled in the art will recognize many of the examples provided have suitable alternatives which may be utilized.

Figure 1:
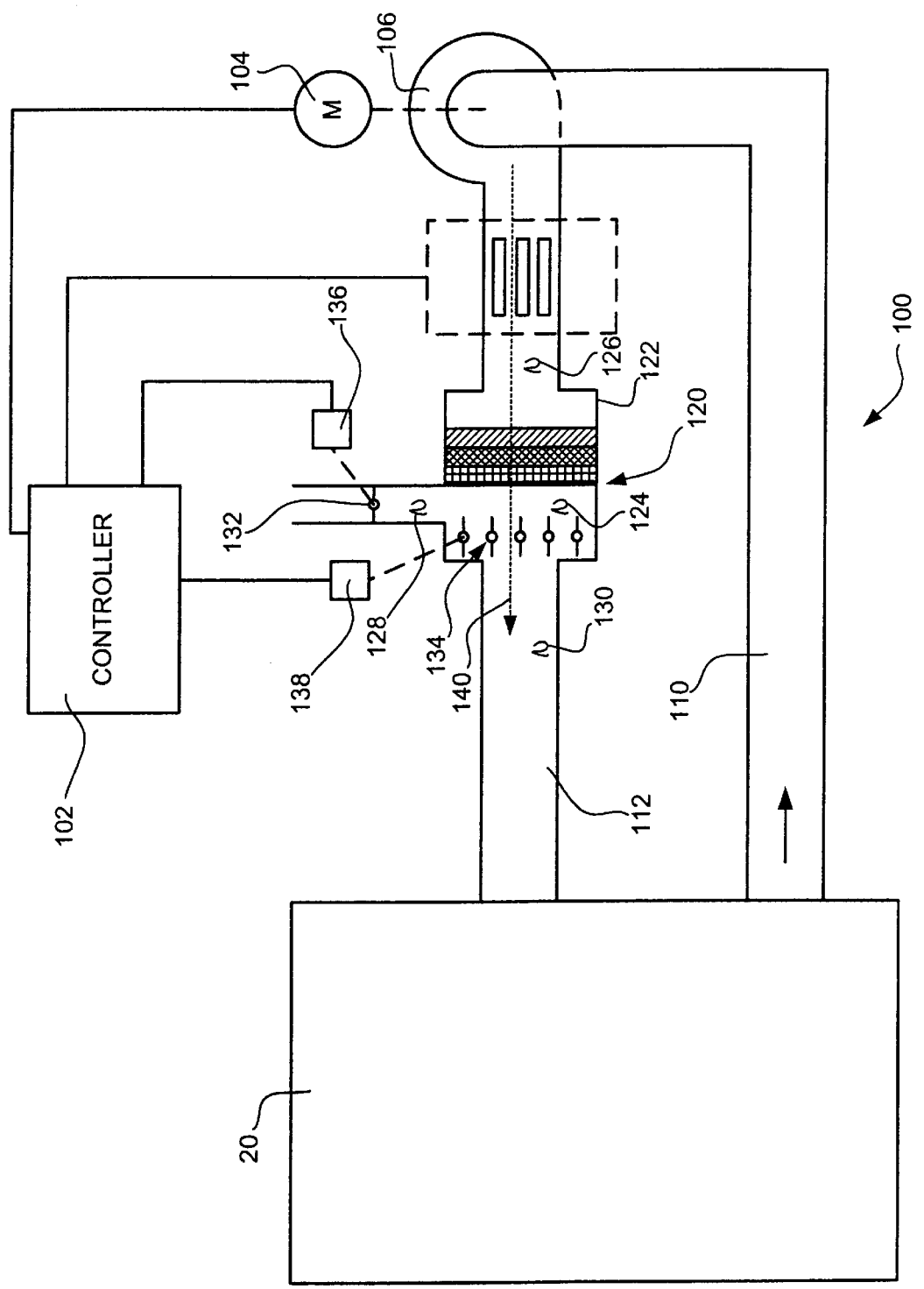
FIG. 1 is a diagrammatic representation of a system for treating air within an inside space in accordance with an illustrative embodiment of the present invention.

FIG. 1 is a diagrammatic representation of an inside space 20 and a system 100 in accordance with an illustrative embodiment of the present invention. The system 100 may be used to treat the air within the inside space 20 by removing vapors (e.g., organic vapors), gases, and particles. Additionally, the system 100 may be used to humidify and de-humidify the air within the inside space 20. Additional embodiments of a system in accordance with the present invention may also be used to ventilate the inside space 20 by introducing fresh air into the inside space 20.

In the illustrative embodiment of FIG. 1, the system 100 includes a controller 102 that is coupled to a motor 104. The motor 104 is coupled to a blower 106. The blower 106 is in fluid communication with a first duct 110 and a second duct 112. The blower 106 may be used to draw air from the inside space 20 through the first duct 110 and return air to the inside space 20 via second duct 112.

An air treatment module 120 is disposed in fluid communication with the blower 106 and the inside space 20. The air treatment module 120 includes a plurality of walls 122 defining a chamber 124, and an inlet 126 in fluid communication with the chamber 124. The air treatment module 120 also includes a first outlet 128, a second outlet 130, a first valve 132, and a second valve 134. Each outlet is in fluid communication with the chamber 124. The first valve 132 is preferably adapted to selectively obstruct the first outlet 128. Likewise, the second valve 134 is preferably adapted to selectively obstruct the second outlet 130. The first valve 132 is coupled to a first actuator 136 and the second valve 134 is coupled to a second actuator 138.

In FIG. 1, it may be appreciated that the controller 102 is coupled to the first actuator 136 and the second actuator 138. The controller 102 is preferably adapted to selectively actuate the first valve 132 and the second valve 134. In the embodiment of FIG. 1, the first valve 132 is in a closed position and the second valve 134 is in an open position. With the first valve 132 and the second valve 134 in the positions shown in FIG. 1, a first air stream 140 passes through the chamber 124 and is directed into the inside space 20.

Figure 2:
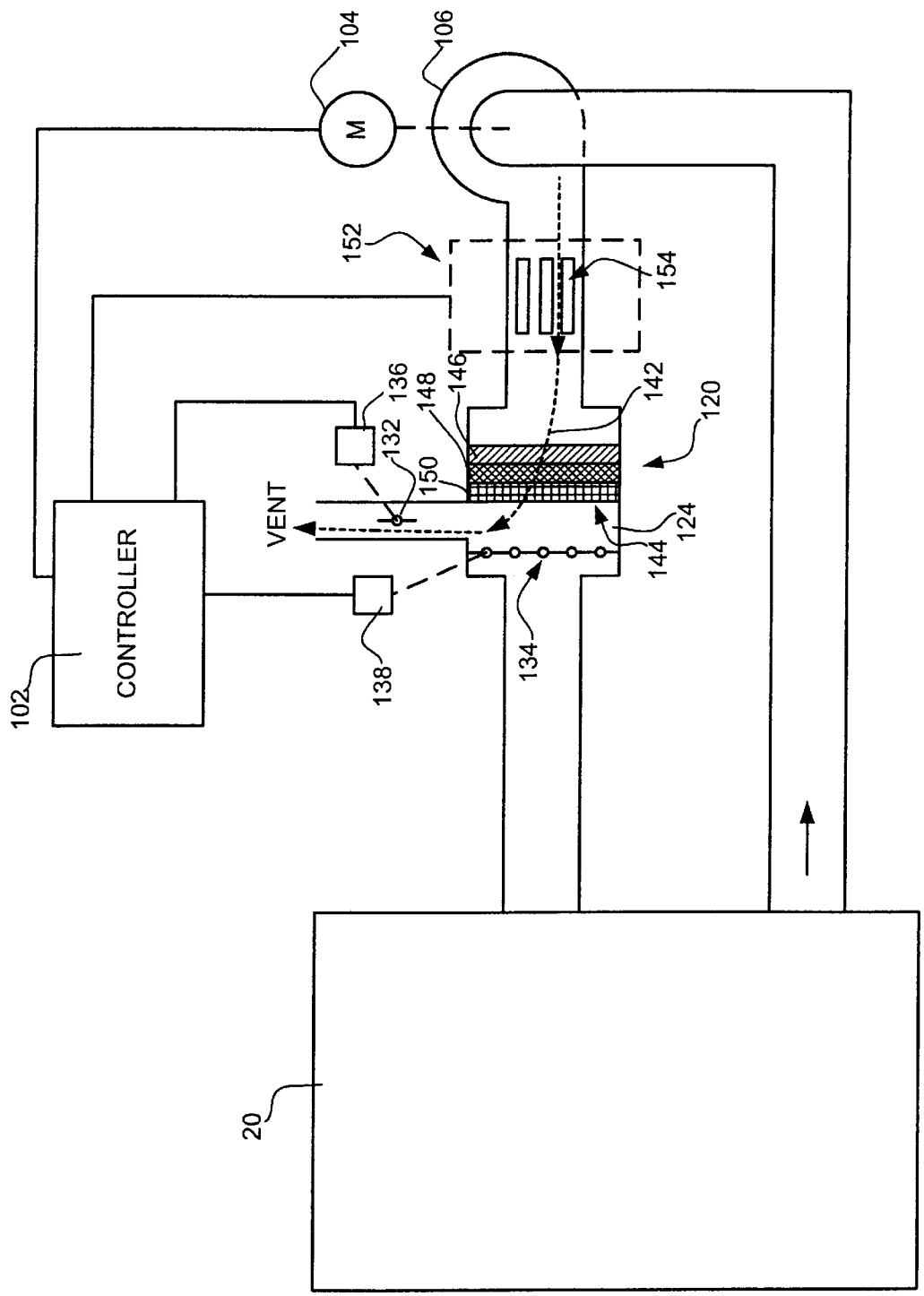
FIG. 2 is an additional view of the system of FIG. 1.

FIG. 2 is an additional view of the system 100 of FIG. 1. In the embodiment of FIG. 2, the first valve 132 has been actuated to an open position by the first actuator 136 and the controller 102. The second valve 134 has been actuated to a closed position by the second actuator 138 and the controller 102. With the first valve 132 and the second valve 134 in the positions shown in FIG. 2, a second air stream 142 passes through the chamber 124 and is directed to a location outside of the inside space 20. In FIG. 2, this location has been labeled VENT.

An air treatment matrix 144 is disposed within the chamber 124 of the air treatment module 120. In the embodiment of FIG. 1 and FIG. 2, the air treatment matrix 144 includes a first panel 146, a second panel 148 and a third panel 150. In a preferred embodiment, the first panel 146 is adapted to remove particles from the air that passes through the chamber 124. The second panel 148 is adapted to adsorb water vapor from the air that passes through the chamber 124, and the water vapor adsorbed by the second panel 148 may be selectively desorbed in a process which may be referred to as regeneration. The third panel 150 is adapted to adsorb organic vapors from the air that passes through the chamber 124. In a particularly preferred embodiment, the organic vapors adsorbed by the third panel 150 may be selectively desorbed in a process which may be referred to as regeneration. The number, type, and relative position of the panels may be varied, as many embodiments of the air treatment matrix 144 are contemplated without deviating from the spirit and scope of the present invention. Various illustrative embodiments of panels for use in the air treatment matrix 144 will be described below.

The system 100 also includes a furnace 152 having a heat exchanger 154 that is in fluid communication with the blower 106 and the air treatment module 120. The furnace 152 may be used to heat an air stream passing through the heat exchanger 154. In the embodiment of FIG. 1, the furnace 152 is coupled to the controller 102. The controller 102 is preferably adapted to selectively activate the furnace 152.

The system 100 may be used to remove vapors from the air in the inside space 20. One method of removing vapors from the air of the inside space 20 may proceed as follows:

1) Directing a first air stream 140 (shown in FIG. 1) from the inside space 20 through the air treatment module 120 and back into inside space 20, wherein air treatment module 120 adsorbs vapor from first air stream 140.

2) Positioning the first valve 132 and the second valve 134 so that a second air stream 142 (shown in FIG. 2) passing through the air treatment module 120 is directed to a location outside of the inside space 20.

3) Activating the furnace 152 to heat second air stream 142 so that second air stream 142 has a temperature that is higher than the temperature of the first air stream 140, wherein at least a portion of vapor adsorbed by the air treatment module 120 is desorbed from the air treatment module 120 and carried away by second air stream 142. Examples of vapors that may be suitable in some applications include water vapor, organic vapors, and volatile organic compounds (VOC's). Examples of organic vapors include ether vapors, hydrocarbon vapors, aldehyde vapors, ester vapors, ketone vapors, amide vapors, and amine vapors.

Figure 3:
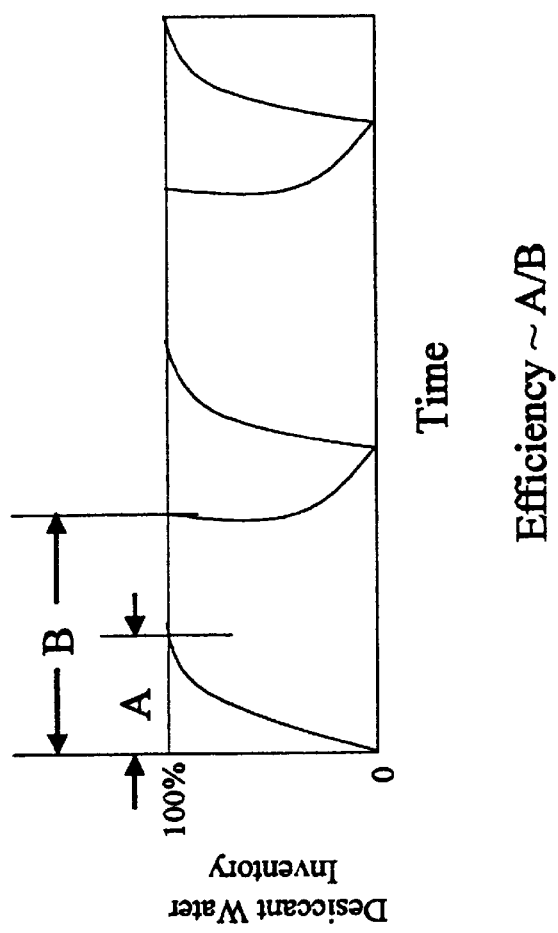
FIG. 3 is a graph showing desiccant water inventory on the vertical axis and time on the horizontal axis.

In one method in accordance with the present invention, the air treatment matrix 144 is adapted to adsorb water vapor from first air stream 140. In this method, second air stream 142 may be directed through the air treatment matrix 144 until substantially all of the water adsorbed from first air stream 140 by the air treatment module 120 is desorbed into second air stream 142. This approach is illustrated in FIG. 3, which is a graph showing desiccant water inventory on the vertical axis and time on the horizontal axis. In FIG. 3 it may be appreciated that the desiccant water inventory approaches zero during each cycle.

It is to be understood that after the very first cycle, the water content and/or the VOC content will not be zero. Instead, the low point in FIG. 3 will be a characteristic determined by the adsorbent type, regeneration time, and temperature. Similarly, the high point will be determined by the feed composition, adsorption time and temperature. The difference between the low and high contents is the effective dynamic capacity. Thus, the 0% and 100% values in FIG. 3 represent 0% and 100% of the effective dynamic capacity.

Figure 4:
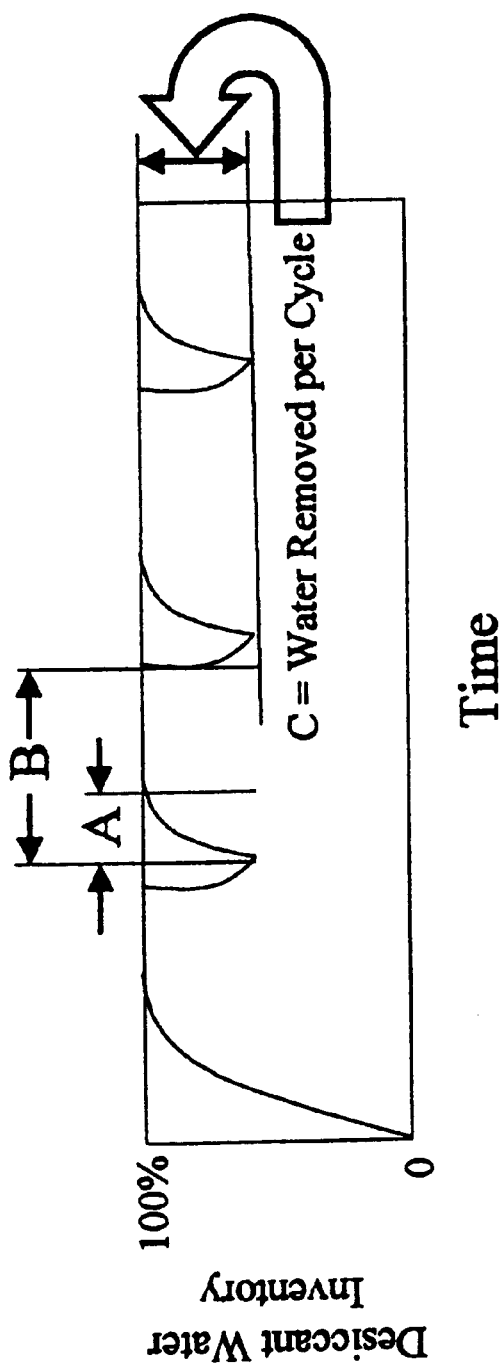
FIG. 4 is a graph showing desiccant water inventory on the vertical axis and time on the horizontal axis.

Methods in accordance with the present invention are also contemplated in which second air stream 142 is directed through the air treatment matrix 144 until a portion of the water adsorbed from first air stream 140 by the air treatment module 120 is desorbed into the second air stream 142. This approach is illustrated in FIG. 4, which is a graph showing desiccant water inventory on the vertical axis and time on the horizontal axis. In FIG. 4 it may be appreciated that some water remains in the desiccant throughout each cycle.

In some applications, it may be desirable to allow some water to remain adsorbed within the air treatment module 120. For example, in one method, water is intentionally left in the air treatment module 120, and a gas which is present in first air stream 140 forms an acidic solution with the water present in the air treatment module 120. This method may be advantageously used to remove gases from the air in the inside space 20. Examples of gases that may be removed using this approach include carbon dioxide gas, and nitrogen dioxide gas.

Figure 5:
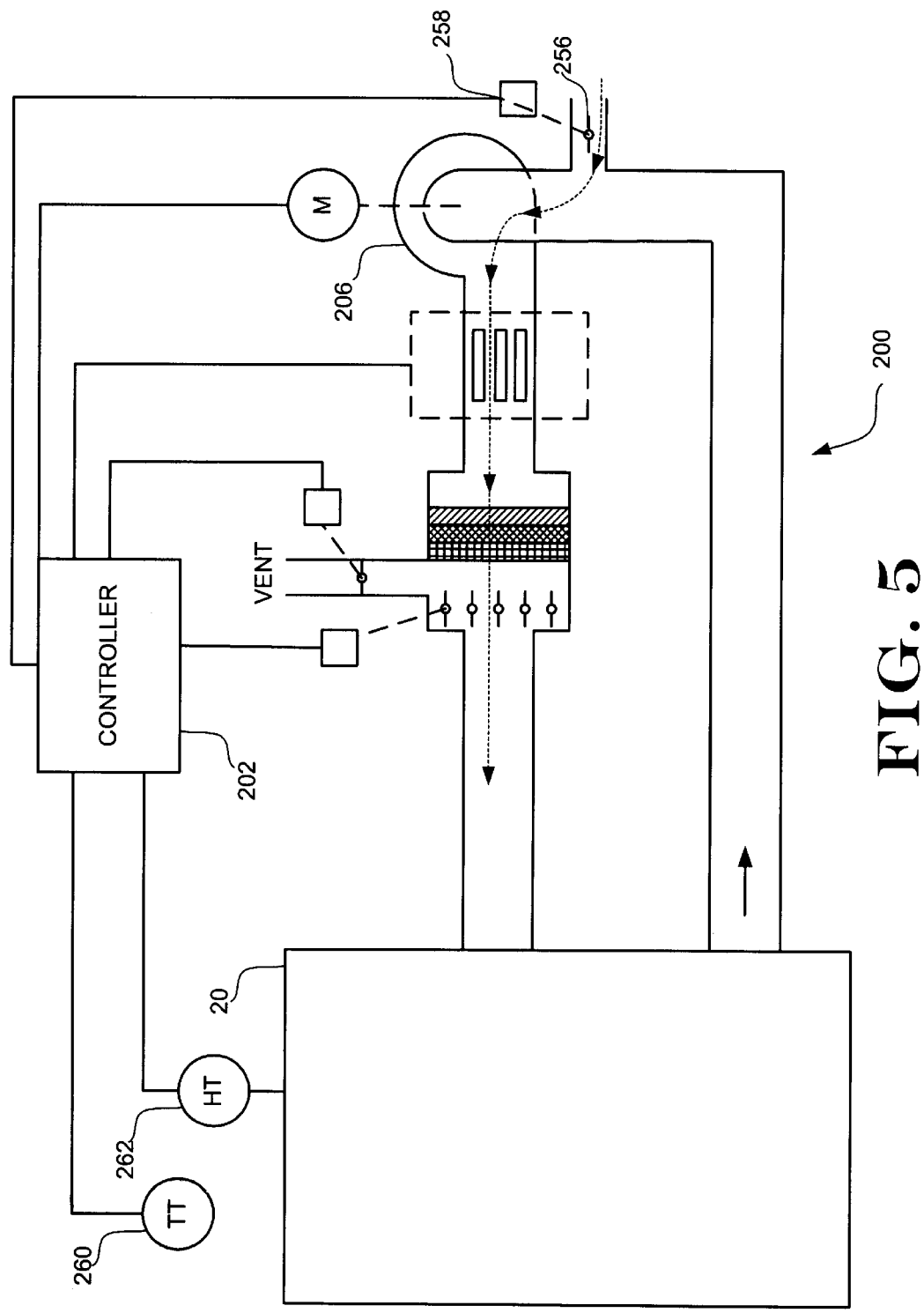
FIG. 5 is a diagrammatic representation of an additional illustrative embodiment of a system in accordance with the present invention.

FIG. 5 is a diagrammatic representation of an additional illustrative embodiment of a system 200 in accordance with the present invention. The system 200 of FIG. 5 is substantially similar to the system 100 of FIGS. 1 and 2, except that the system 200 includes a third valve 256. The third valve 256 is coupled to a third actuator 258 that is coupled to a controller 202. The third valve 256 may be selectively activated to place the blower 206 in fluid communication with air that is outside of the inside space 20. The controller 202 is preferably adapted to selectively activate the third valve 256 to introduce fresh air into the inside space 20.

The system 200 of FIG. 5 also includes a temperature transducer 260 that is coupled to the controller 202 and is adapted to supply the controller 202 with a signal which is indicative of the air temperature within the inside space 20. The system 200 also includes a humidity transducer 262 that is coupled to the controller 202 and is adapted to supply the controller 202 with a signal which is indicative of the humidity of the air within the inside space 20. The controller 202 may use the signals from the temperature transducer 260 and the humidity transducer 262 as input to control algorithms. It should be appreciated that the system 100 of FIG. 1 may also include the temperature transducer 260 and/or the humidity transducer 262 without deviating from the spirit and scope of the present invention. It should also be appreciated that other systems in accordance with the present invention may include the temperature transducer 260 and/or the humidity transducer 262 without deviating from the spirit and scope of the present invention.

Figure 6:
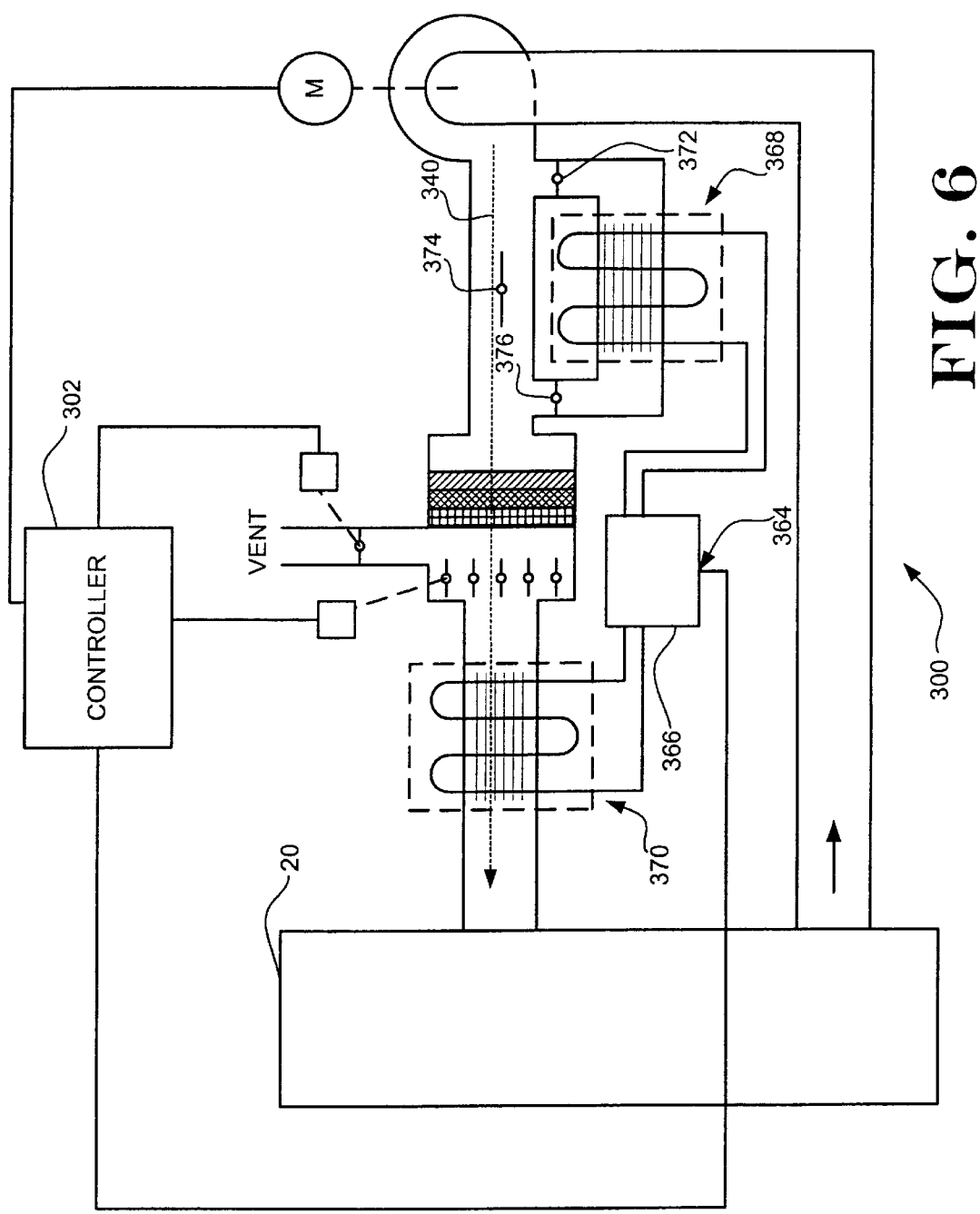
FIG. 6 is a diagrammatic representation of yet another illustrative embodiment of a system in accordance with the present invention.

FIG. 6 is a diagrammatic representation of yet another illustrative embodiment of a system 300 in accordance with the present invention. The system 300 of FIG. 6 includes an air conditioner 364 having a compressor 366, a condenser 368 and an evaporator 370. In FIG. 6, a first air stream 340 is shown flowing through the evaporator 370. The evaporator 370 may be used to cool first air stream 340 before it enters the inside space 20. In FIG. 6 it may be appreciated that the system 300 includes a fourth valve 372, a fifth valve 374, and a sixth valve 376.

Figure 7:
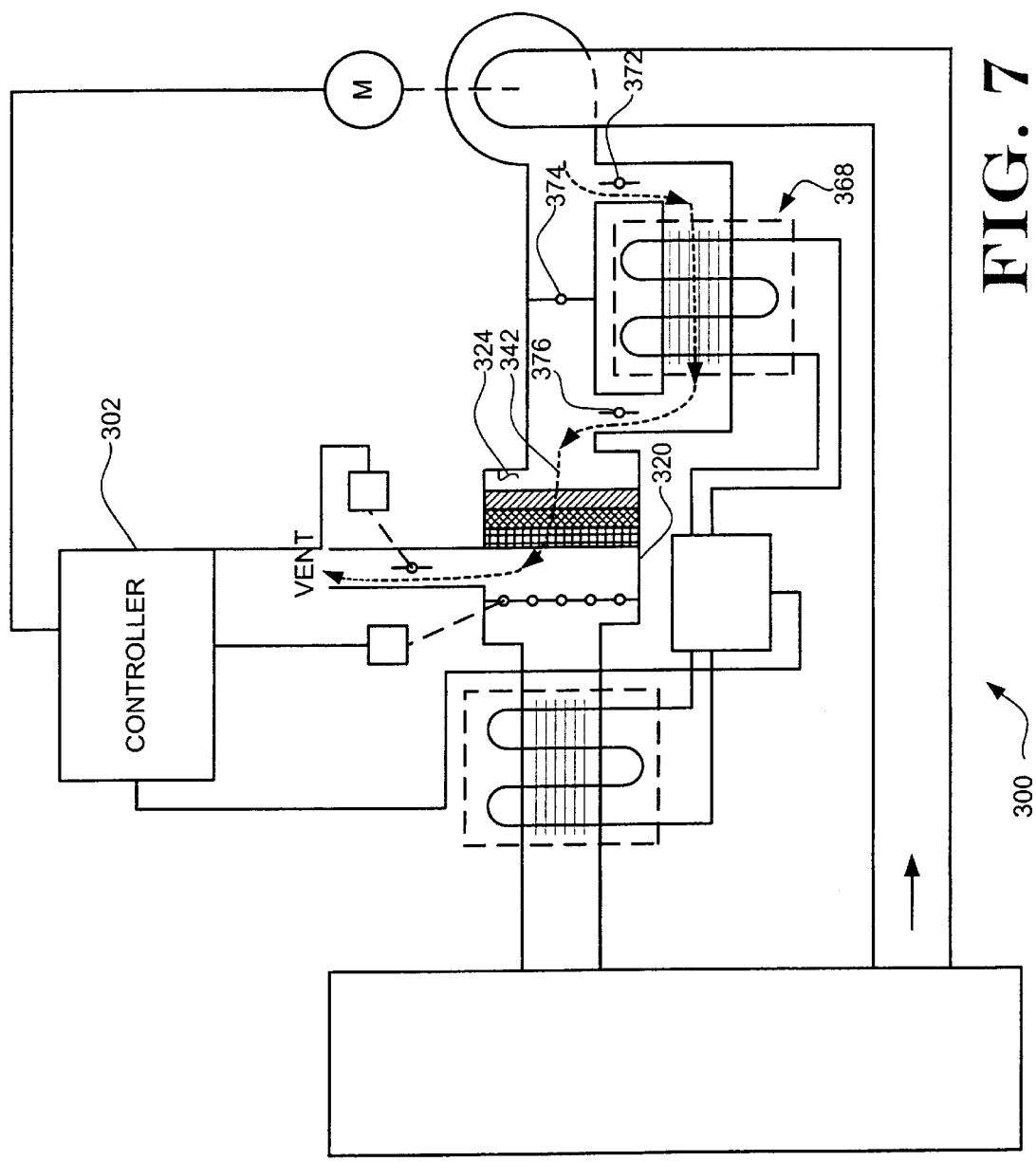
FIG. 7 is an additional view of the system of FIG. 6.

FIG. 7 is an additional view of the system 300 of FIG. 6. In the embodiment of FIG. 7, the fourth valve 372, the fifth valve 374, and the sixth valve 376 have each been actuated by actuators (not shown) so that they direct the flow of a second air stream 342. The actuators associated with the fourth valve 372, the fifth valve 374, and the sixth valve 376 are all preferably coupled to the controller 302. Second air stream 342 flows past the condenser 368 and through the chamber 324 of the air treatment module 320. In the embodiment of FIG. 7, the condenser 368 may be used to heat the second air stream 342.

Figure 8:
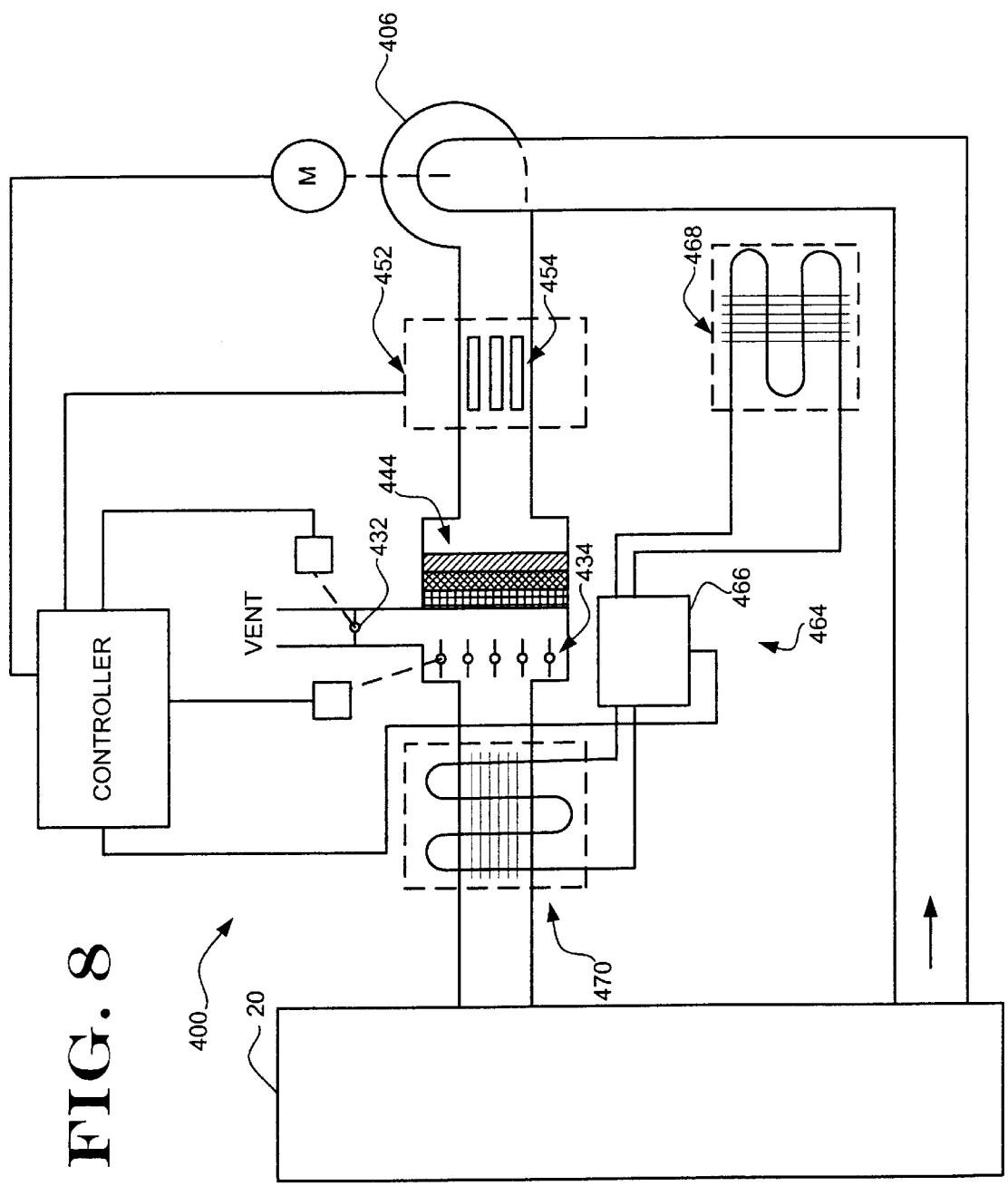
FIG. 8 is a diagrammatic representation of yet another illustrative embodiment of a system in accordance with the present invention.

FIG. 8 is a diagrammatic representation of yet another illustrative embodiment of a system 400 in accordance with the present invention. The system 400 of FIG. 8 includes a furnace 452 having a heat exchanger 454. The system 400 also includes an air conditioner 464 having a compressor 466, a condenser 468 and an evaporator 470. In the diagram shown, the evaporator 470 and heat exchanger 454 are on opposite sides of the chamber. It is contemplated however, that the evaporator 470 and heat exchanger may be placed at or near a single location such as a conventional furnace/air conditioning system. The operation of the system 400 during a cooling season may be described with reference to Table 1 below.

TABLE 1

| Stage | Stage Description | Compressor 466 | Blower 406 | First Valve 432 | Second Valve 434 | Furnace 452 |
|---|---|---|---|---|---|---|
| A | Start | ON | OFF | CLOSED | OPEN | OFF |
| B | Cooling-dry | ON | ON | CLOSED | OPEN | OFF |
| D | Cooling-Stop | OFF | ON | CLOSED | OPEN | OFF |

TABLE 1-continued

| Stage | Stage Description | Compressor 466 | Blower 406 | First Valve 432 | Second Valve 434 | Furnace 452 |
|---|---|---|---|---|---|---|
| E | Regeneration-heating | OFF | ON | OPEN | CLOSED | ON |
| F | Regeneration-purge | OFF | ON | OPEN | CLOSED | OFF |

Stage A of Table 1 is a beginning stage in which the blower 406 is off and the air conditioner compressor 466 is on. During stage B, the blower 406 is turned on so that an air stream flows past the second valve 434 and the evaporator 470 into the inside space 20. This provides cold air into space 20. Vapors are preferably adsorbed from the air as the air stream flows through the air treatment matrix 444. In stage D, the cooling of the air stream is stopped by turning the compressor 466 off.

Stage E is a regeneration/heating stage. In stage E, the first valve 432 is opened and the second valve 434 is closed so that an air stream is directed through the air treatment matrix 444 to a location outside of the inside space 20. The furnace 452 is turned on so that it heats the air stream. The heated air stream heats the air treatment matrix, causing it to desorb the previously adsorbed vapors. The desorbed vapors are carried by the air stream to a location outside of the inside space 20. During Stage F, the furnace 452 is turned off, but the flow of the purging air stream continues, preferably allowing the air treatment matrix 444 to cool.

The operation of the system 400 during a heating season may be described with reference to Table 2 below. It may be noted in Table 2, the compressor 466 of the air conditioner 464 typically remains off.

TABLE 2

| Stage | Stage Description | Compressor 466 | Blower 406 | First Valve 432 | Second Valve 434 | Furnace 452 |
|---|---|---|---|---|---|---|
| A | Start | OFF | OFF | CLOSED | OPEN | OFF |
| B | Heating | OFF | ON | CLOSED | OPEN | ON |
| D | Heating | OFF | ON | CLOSED | OPEN | OFF |
| E | Regeneration-heating | OFF | ON | OPEN | CLOSED | ON |
| F | Regeneration-purge | OFF | ON | OPEN | CLOSED | OFF |

Stage A of Table 2 is a beginning stage in which the blower 406 is off and the furnace 452 is off. During stage B, both the blower 406 and the furnace 452 are turned on so that an air stream flows past the heat exchanger 454 of the furnace 452 and into the inside space 20. Vapors are preferably adsorbed from the air as the air stream flows through the air treatment matrix 444. In stage D, the heating of the air stream is stopped by turning the furnace off. Turning the furnace off and on may be used to regulate the temperature of the air contained within the inside space 20.

Stage E is a regeneration/heating stage. In stage E, the first valve 432 is opened and the second valve 434 is closed so that an air stream is directed through the air treatment matrix 444 to a location outside of the inside space 20. The furnace 452 is turned on so that it heats the air stream. The heated air stream heats the air treatment matrix, causing it to desorb vapors. In a particularly preferred embodiment, the volumetric flow rate of air passing through the air treatment matrix 444 is less during the regeneration stage, thereby causing an increase in temperature of the air passing through the air treatment matrix 444. The desorbed vapors are preferably carried away by the air stream to a location outside of the inside space 20. During Stage F, the furnace 452 is turned off, but the flow of the purging air stream continues, preferably allowing the air treatment matrix 444 to cool.

Figure 9:
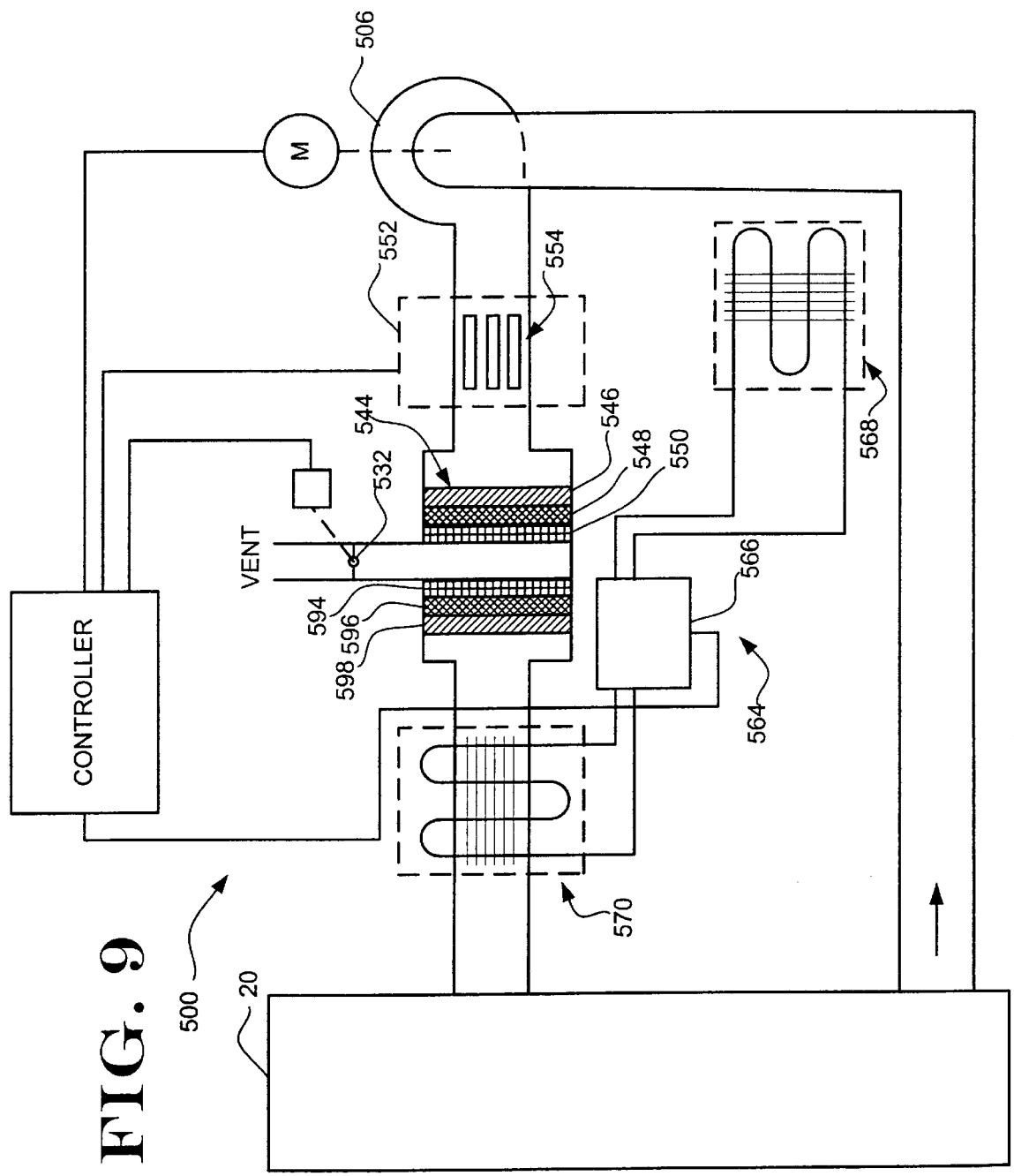
FIG. 9 is a diagrammatic representation of yet another illustrative embodiment of a system in accordance with the present invention.

FIG. 9 is a diagrammatic representation of yet another illustrative embodiment of a system 500 in accordance with the present invention. The system 500 of FIG. 9 operates using a single valve (first valve 532). The system 500 includes a furnace 552 having a heat exchanger 554. The system 500 also includes an air conditioner 564 having a compressor 566, a condenser 568 and an evaporator 570.

The system 500 of FIG. 9 also includes an air treatment matrix 544. The illustrative air treatment matrix 544 includes a first panel 546, a second panel 548, a third panel 550, a fourth panel 594, a fifth panel 596, and a sixth panel 598. In a preferred embodiment, the first panel 546 and the sixth panel 598 are roughing filters (e.g., 20–30% ASHRAE according to ASHRAE standard 52.5). The second panel 548 and the fifth panel 596 are high efficiency filters (e.g., >90% efficiency according to ASHRAE standard 52.2). The third panel 550 and the fourth panel 594 include a plurality of fibrils and an adsorbent material.

The operation of the system 500 may be described with reference to Table 3 below.

TABLE 3

| Stage | Description | Compressor 566 | Blower 506 | First Valve 532 | Furnace 552 |
|---|---|---|---|---|---|
| A | Start | ON | OFF | CLOSED | OFF |
| B | Cooling-dry | ON | ON | CLOSED | OFF |
| D | Cooling-Stop | OFF | ON | CLOSED | OFF |
| E | Regeneration-heating | OFF | ON | OPEN | ON |
| F | Regeneration-purge | OFF | ON | OPEN | OFF |

Stage A of Table 3 is a beginning stage in which the blower 506 is off, the air conditioner compressor 566 is off, and the furnace 552 is off. During stage B, the blower 506 is turned on so that an air stream flows past the evaporator 570 into the inside space 20. Vapors are preferably adsorbed from the air as the air stream flows through the air treatment matrix 544.

Stage E is a regeneration/heating stage. In stage E, the first valve 532 is opened allowing an air stream to pass to a location outside of the inside space 20. Referring to FIG. 9, it will be noted that the regeneration/heating stage may be accomplished utilizing a single valve, namely first valve 532. This single valve operation reduces the complexity of system 500.

Also during stage E, the furnace 552 is turned on so that it heats the air stream. The heated air stream, preferably, heats the air treatment matrix 544, causing it to desorb vapors as it passes through the first panel 546, the second panel 548, and the third panel 550 of the air treatment matrix 544. The desorbed vapors are preferably carried away by the air stream to a location outside of the inside space 20. During Stage F, the furnace 552 is turned off, but the flow of the purging air stream continues, preferably allowing the air treatment matrix 544 to cool.

Figure 10:
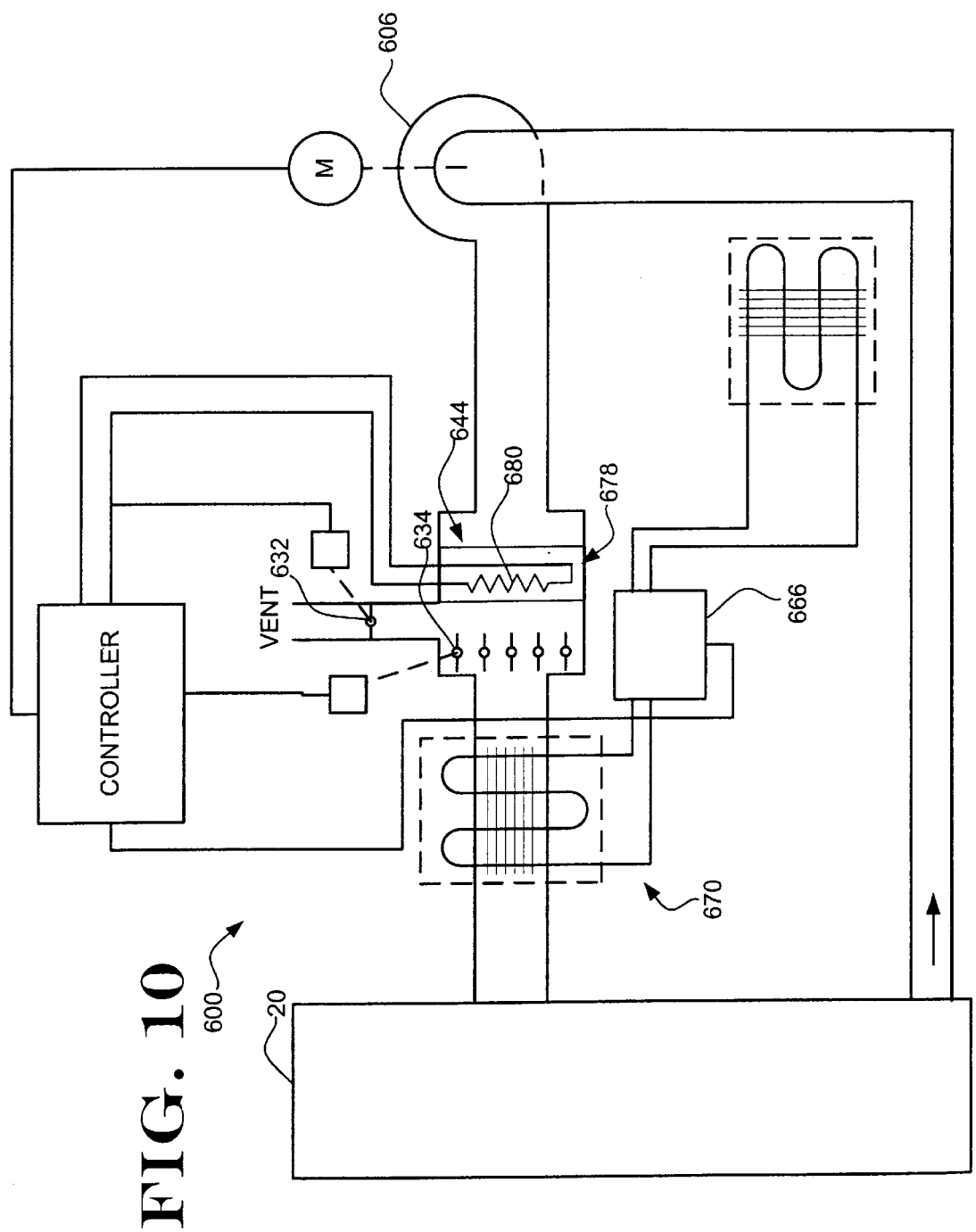
FIG. 10 is a diagrammatic representation of yet another illustrative embodiment of a system in accordance with the present invention.

FIG. 10 is a diagrammatic representation of yet another illustrative embodiment of a system 600 in accordance with the present invention. The system 600 of FIG. 10 includes an air treatment matrix 644 having a heater 678. The heater 678 preferably includes a heating element 680. The operation of the system 600 may be described with reference to Table 4 below.

The fibrils 784 define a plurality of the air flow pathways 786. The air flow pathways 786 are preferably substantially tortuous. The panel 747 also preferably includes a dessicant deposition preferably disposed between lobes of the fibrils 784.

It is to be appreciated that various desiccants may be utilized without deviating from the spirit and scope of the present invention. Examples of desiccants which may be suitable in some applications are included in the list below which is not exhaustive: alumina, aluminum oxide, activated carbon, barium oxide, barium perchlorate, calcium bromide, calcium chloride, calcium hydride, calcium oxide, sulfate, glycerol, glycols, lithium aluminum hydride, lithium bromide, lithium chloride, lithium iodide, magnesium chloride, magnesium perchlorate, magnesium sulfate, molecular sieves, phosphorus pentoxide, potassium hydroxide (fused, sticks, etc.), potassium carbonate, resins, silica gel, sodium hydroxide, sodium iodide, sulfuric acid, titanium silicate, zeolites, zinc bromide, zinc chloride, and combinations of such desiccants. The desiccants may be used in various forms. For example, the desiccant may a solids and/or a liquid. The desiccant may also comprise part of an aqueous solution.

Figure 12:
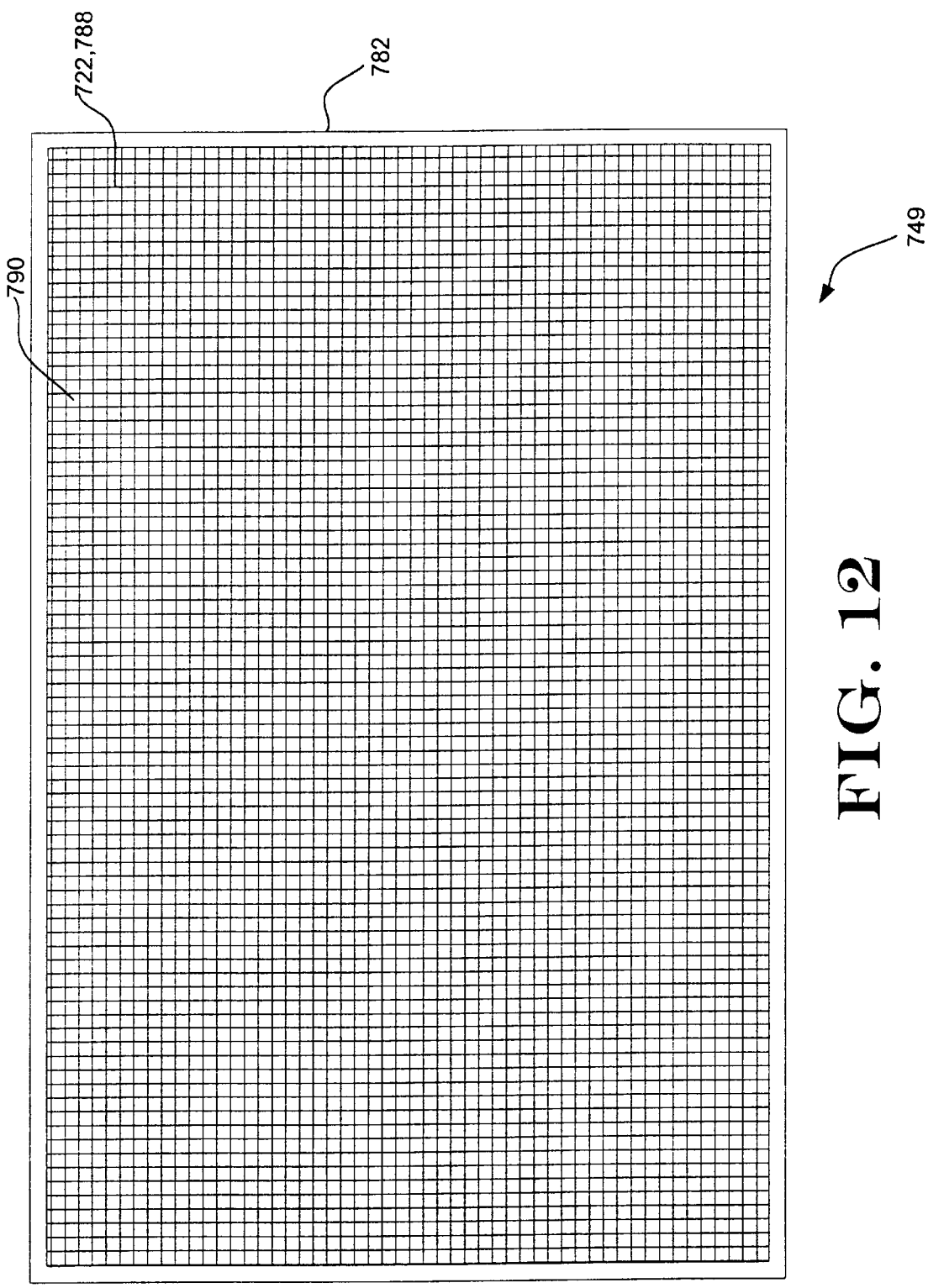
FIG. 12 is a plan view of an additional illustrative embodiment of a panel in accordance with the present invention.

FIG. 12 is a plan view of an additional illustrative embodiment of a panel 749 in accordance with the present invention. Panel 749 is preferably included in an air treatment matrix as described above. The illustrative panel 749 includes a frame 782 and a plurality of walls 722 defining a

TABLE 4

| Stage | Stage Description | Compressor 666 | Blower 606 | First Valve 632 | Second Valve 634 | Heater 678 |
| --- | --- | --- | --- | --- | --- | --- |
| A | Start | ON | OFF | CLOSED | OPEN | OFF |
| B | Cooling-dry | ON | ON | CLOSED | OPEN | OFF |
| D | Cooling-Stop | OFF | ON | CLOSED | OPEN | OFF |
| F | Regeneration-heating | OFF | ON | OPEN | CLOSED | ON |
| F | Regeneration-purge | OFF | ON | OPEN | CLOSED | OFF |

Stage A of Table 4 is a beginning stage in which the blower 606 is off and the air conditioner compressor 666 is on. During stage B, the blower 606 is turned on so that an air stream flows through the air treatment matrix 644 and into the inside space 20. This provides cool air into space 20. Vapors are preferably adsorbed from the air as the air stream flows through the air treatment matrix 644. In stage D, the cooling of the air stream is stopped by turning the compressor 666 off.

Stage E is a regeneration/heating stage. In stage E, the first valve 632 is opened and the second valve 634 is closed so that an air stream is directed through the air treatment matrix 644 to a location outside of the inside space 20. The heater 678 is turned on so that it heats the air treatment matrix 644 causing it to desorb vapors. The desorbed vapors are preferably carried away by the air stream to a location outside of the inside space 20. During Stage F, the heater 678 is turned off, but the flow of the purging air stream continues, preferably allowing the air treatment matrix 644 to cool.

Figure 11:
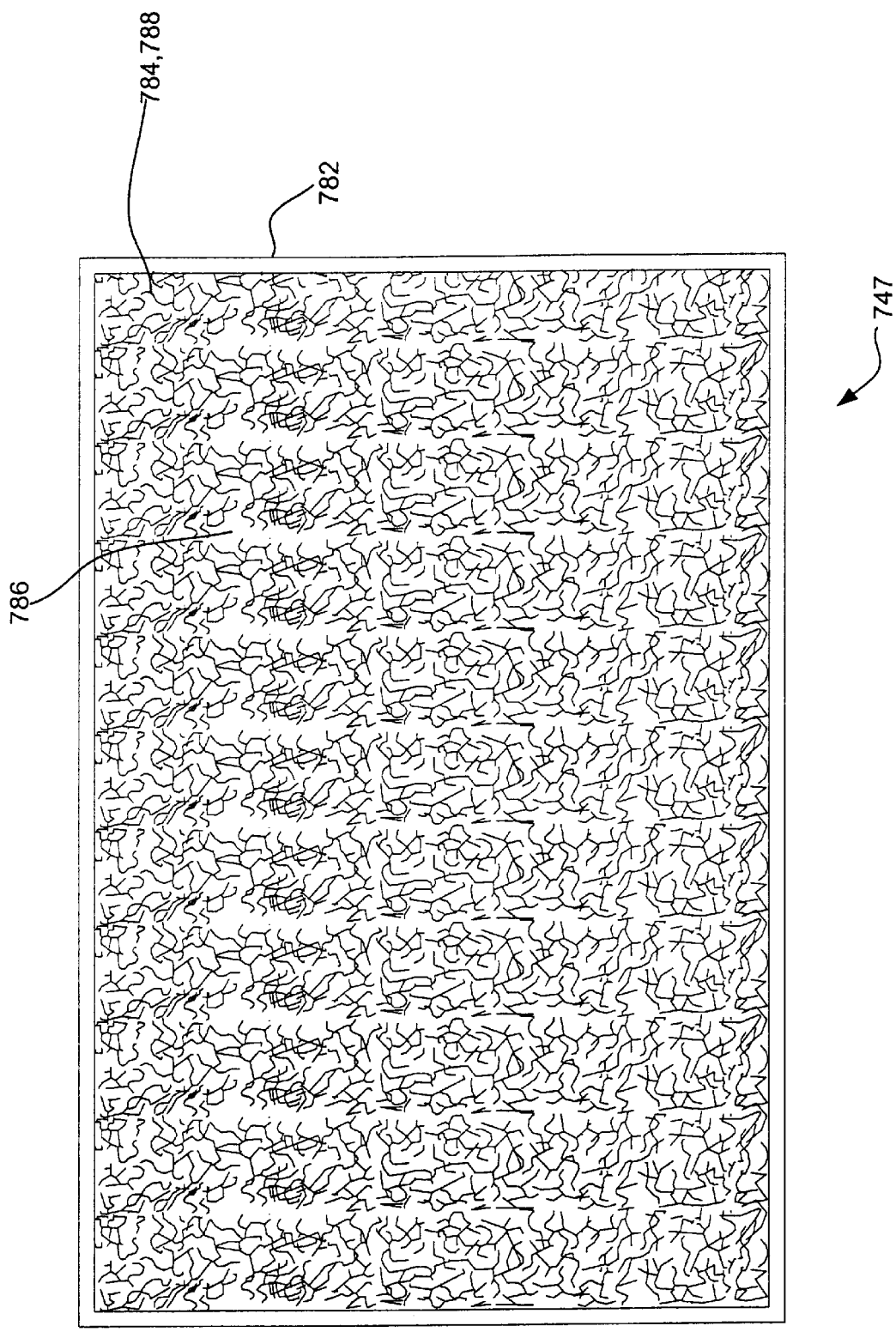
FIG. 11 is a plan view of an illustrative embodiment of a panel in accordance with the present invention.

FIG. 11 is a plan view of an illustrative embodiment of a panel 747 in accordance with the present invention. Panel 747 is preferably included in an air treatment matrix as described above.

The panel 747 comprises a frame 782 and a plurality of fibrils 784. In the embodiment of FIG. 11, the fibrils 784 are arranged in a substantially randomly intertangled pattern.

plurality of the air flow channels 790. In the embodiment of FIG. 12, each air flow channel 790 has a substantially polyhedral shape including an inlet surface, an outlet surface and four side surfaces. The air flow channels 790 may have other shapes (e.g., cylindrical, decahedral, etc.) without deviating from the spirit and scope of the present invention. The panel 749 also preferably includes a deposition 788 overlaying at least some of walls 722. In some embodiments, walls 722 include an electrically conductive material that warms when an electrical current is provided therethrough. Thus, the walls 722 may act as heating element 780 of FIG. 10.

The deposition 788 preferably includes a desiccant. The deposition 788 may include additional materials without deviating from the spirit and scope of the present invention. Examples of additional materials include odor absorbent materials. For example, an exemplary deposition may include a desiccant, a first odor absorbent, and second odor absorbent. By way of a second example, the deposition may include carbon, a zeolite and chemically coated alumina or silica.

Figure 13:
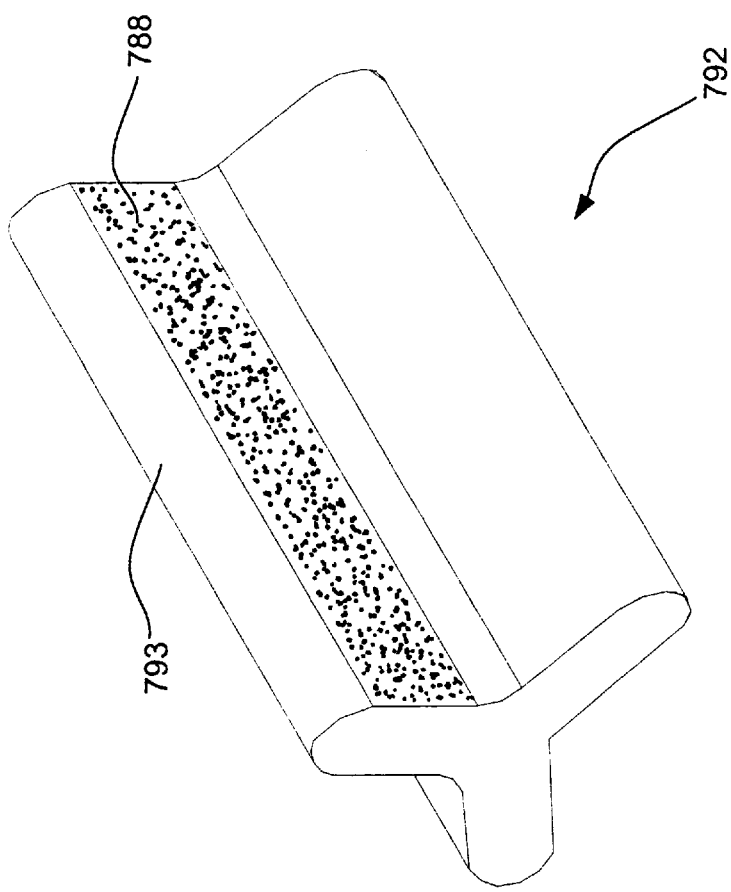
FIG. 13 is a perspective view of a fiber in accordance with an illustrative embodiment of the present invention.

FIG. 13 is a perspective view of a fiber or granule 792 in accordance with an illustrative embodiment of the present invention. Fiber or granule 792 had a trilobal shape, and includes a plurality of lobes 793. The fiber or granule 792 may further include a deposition 788 overlaying an outer surface of at least one of the lobes 793.

In one illustrative embodiment, a panel may be provided that includes a plurality of granules, like granules 792 of FIG. 13, randomly stacked so that they define a plurality of air flow pathways. The air flow pathways are preferably substantially tortuous. The plurality of granules may be contained between a front screen and a back screen. An outer frame may be disposed about the outer edges of the front screen and the back screen.

Each granule 792 preferably includes a deposition 788 overlaying one or more outer surfaces of the granule 792, the deposition 788 preferably includes a desiccant. The deposition 788 may, of course, include additional materials. For example, the deposition 788 may include a desiccant, a first odor absorbing material and a second absorbing material. By way of a second example, deposition 788 may include carbon, a zeolite, and chemically coated alumina or silica. Additional embodiments of granule 792 are possible without deviating from the spirit and scope of the present invention. For example, embodiments of granule 792 which do not include deposition 788 have been envisioned. Embodiments of granule 792 have also been envisioned in which the body granule 792 is formed of a desiccant material. In the embodiment of FIG. 13, the granule 792 has a generally trilobal shape. Granules in accordance with the present invention may have other shapes (e.g., spherical, tubular, etc.) without deviating from the spirit and scope of the present invention.

Figure 14:
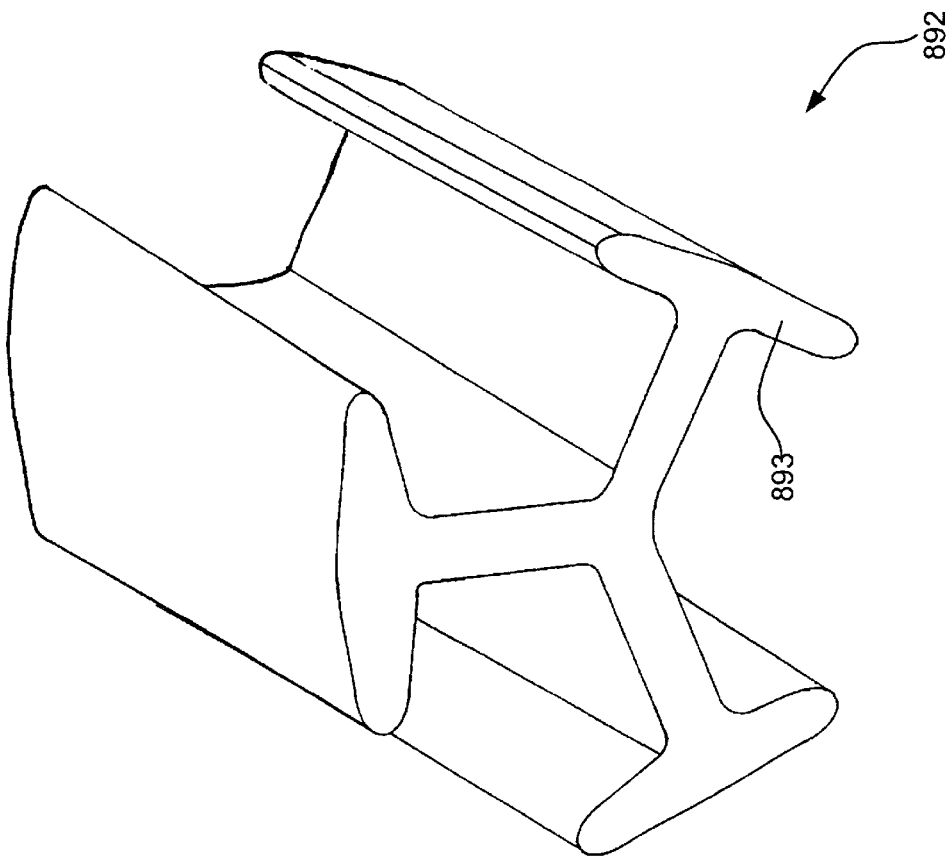
FIG. 14 is a perspective view of a fiber or granule 892 in accordance with an illustrative embodiment of the present invention.

FIG. 14 is a perspective view of a fiber or granule 892 in accordance with an illustrative embodiment of the present invention. Referring back to FIG. 11, it is contemplated that the fibrils 784 of FIG. 11 may have a generally triad shape, as shown in FIG. 14. In the embodiment of FIG. 14, fiber 892 includes a plurality of lobes 893 with endcaps, as described in U.S. Pat. No. 5,057,368, which is incorporated herein by reference.

Figure 15:
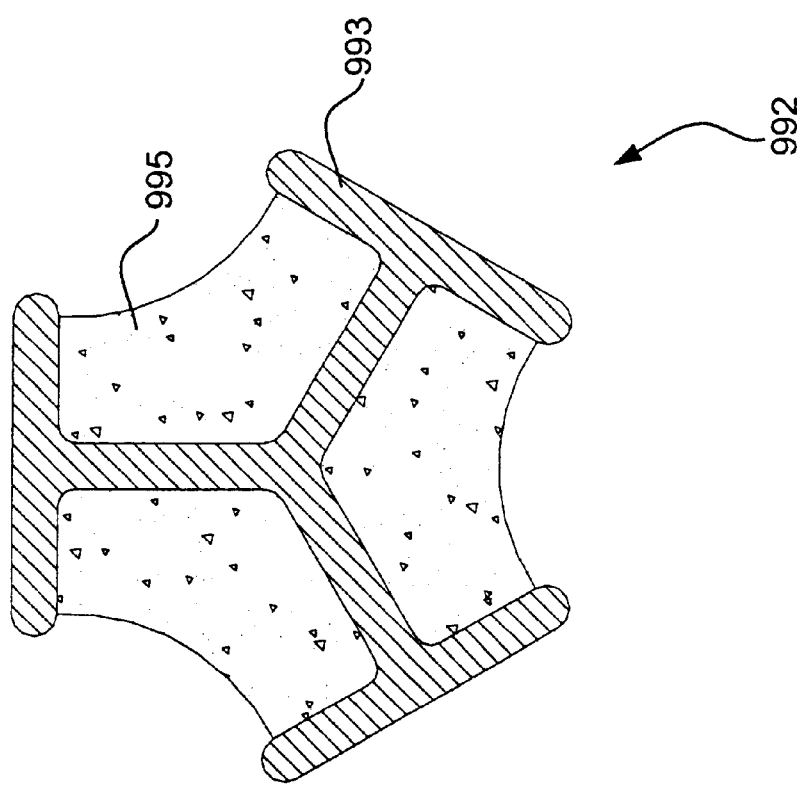
FIG. 15 is a cross-sectional view of a fiber 992 in accordance with an illustrative embodiment of the present invention.

FIG. 15 is a cross-sectional view of a fiber 992 in accordance with an illustrative embodiment of the present invention. Referring back to FIG. 11, it is contemplated that the fibrils 784 of FIG. 11 may have a generally triad shape, as shown in FIG. 15. In the embodiment of FIG. 15, fiber 992 includes a plurality of lobes with endcaps 993. In the embodiment of FIG. 15, a desiccant deposit 995 is disposed between each adjacent pair of lobes 993.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. An air treatment module for removing vapors and/or gases from air in an inside space of a building, comprising:
    a plurality of chamber walls defining a chamber;
    an inlet in fluid communication with the chamber, the inlet for receiving an air stream from the inside space of the building;
    a first outlet in fluid communication with the chamber and in fluid communication with the inside space of the building;
    a second outlet in fluid communication with the chamber and in fluid communication with an outside space of the building;
    one or more valves for selectively directing the air stream between the first output and the second outlet;
    an air treatment matrix positioned in the chamber for receiving the air stream from the inside space of the building, the air treatment matrix adapted to adsorb vapors and/or gases from the air stream, the air treatment matrix including a plurality of matrix walls defining a plurality of air flow channels, wherein at least some of the matrix walls include a material that warms when an electrical current is conducted therethrough; and
    heating means for at least selectively providing electric current through at least some of the matrix walls of the air treatment matrix to heat the air stream from the inside space of the building, the heating means selectively heating the air stream sufficiently so that the air treatment matrix desorbs at least a portion of the absorbed vapors and/or gases;
    control means for selectively activating the heating means and the one or more valves so that the heating means heats the air stream causing the air treatment module to desorb at least a portion of the adsorbed vapors and/or gases while the valve means directs at least a portion of the desorbed vapors and/or gases to the outside space via the second outlet of the chamber.

2. The air treatment module of claim 1, wherein the air treatment matrix includes a first panel adapted to adsorb water and a second panel adapted to adsorb one or more organic vapors.

3. The air treatment module of claim 1, wherein the air treatment matrix comprises a plurality of granules.

4. The air treatment module of claim 3, wherein at least some of the granules include a desiccant.

5. The air treatment module of claim 3, wherein at least some of the granules have a substantially spherical shape.

6. The air treatment module of claim 1, wherein the air treatment matrix comprises a plurality of fibrils.

7. The air treatment module of claim 6, wherein the fibrils are arranged in a substantially randomly intertangled pattern.

8. The air treatment module of claim 6, further including a coating overlaying at least some of the fibrils.

9. The air treatment module of claim 8, wherein the coating includes a desiccant.

10. The air treatment module of claim 1, further including a coating overlaying at least some of the matrix walls.

11. The air treatment module of claim 10, wherein the coating includes a desiccant.

12. The air treatment module of claim 1, wherein at least some of the matrix walls include a metal.

13. A system for removing vapors and/or gases from air in an inside space of a building, comprising:
    an air treatment module for receiving an air stream from the inside space of the building, the air treatment module adapted to adsorb vapors and/or gases from the air stream;
    heating means for selectively heating the air stream from the inside space of the building before and/or after the air stream is received by the air treatment module, the heating means selectively heating the air stream sufficiently so that the air treatment module desorbs at least a portion of the absorbed vapors and/or gases;
    one or more valves situated downstream of at least part of the air treatment module for selectively directing the air stream to either the inside space or an outside space; and control means for selectively activating the heating means and the one or more valves so that the heating means heats the air stream causing the air treatment module to desorb at least a portion of the adsorbed vapors and/or gases while the valve means directs at least a portion of the desorbed vapors and/or gases to the outside space.

14. A system according to claim 13 wherein the valve means includes a single valve.

15. A system according to claim 13 wherein the valve means includes two or more valves.

16. A system according to claim 13 wherein the heating means includes a heat exchanger.

17. A system according to claim 16 wherein the heat exchanger is part of a furnace.

18. A system according to claim 13 wherein the heating means includes a resistive heater.

19. A system according to claim 13 wherein the heating means includes a condenser of an air conditioner.

20. A system according to claim 13 wherein the air stream is directed past an evaporator of an air conditioner before being provided to the inside space.

21. A system according to claim 13 wherein the air stream passes through the air treatment module in the same direction regardless of whether the air stream is directed to the inside space or the outside space.

22. A system for removing vapors and/or gases from air in an inside space of a building, comprising:

an air treatment module for receiving an air stream from the inside space of the building, the air treatment module adapted to adsorb vapors and/or gases from the air stream;

heater for selectively heating the air stream before and/or after the air stream is received by the air treatment module, the heater selectively heating the air stream sufficiently so that the air treatment module desorbs at least a portion of the adsorbed vapors and/or gases;

directing means situated downstream of at least part of the air treatment module for selectively directing the air stream to either the inside space or an outside space; and means for reducing the volumetric flow rate of the air stream when the air stream is directed to the outside space relative to when the air stream is directed to the inside space.

23. A system according to claim 22 further comprising:

control means for selectively activating the heater and the directing means so that the heater heats the air stream causing the air treatment module to desorb at least a portion of the adsorbed vapors and/or gases while the directing means directs at least a portion of the desorbed vapors and/or gases to the outside space.

* * * * *